United States Patent [19]

Yuasa

[11] Patent Number: 4,617,499
[45] Date of Patent: Oct. 14, 1986

[54] BRUSHLESS MOTOR

[75] Inventor: Masami Yuasa, Tokyo, Japan

[73] Assignee: Sony Corporation, Tokyo, Japan

[21] Appl. No.: 800,293

[22] Filed: Nov. 21, 1985

[30] Foreign Application Priority Data

Nov. 29, 1984 [JP] Japan ................................ 59-252181

[51] Int. Cl.$^4$ ............................................ H02K 29/00
[52] U.S. Cl. .................................... 318/254; 318/138; 318/439
[58] Field of Search ................. 318/138, 254, 439, 696

[56] References Cited

U.S. PATENT DOCUMENTS

| | | | |
|---|---|---|---|
| 4,004,202 | 1/1977 | Davis | 318/254 X |
| 4,158,795 | 6/1979 | Tarumi et al. | 318/290 X |
| 4,358,720 | 11/1982 | Abe | 318/254 |
| 4,417,167 | 11/1983 | Ishii et al. | 310/67 R |

FOREIGN PATENT DOCUMENTS

| | | | |
|---|---|---|---|
| 57-80297 | 5/1982 | Japan | 318/254 |
| 0754595 | 8/1980 | U.S.S.R. | 318/254 |

Primary Examiner—William M. Shoop, Jr.
Assistant Examiner—Bentsu Ro
Attorney, Agent, or Firm—Lewis H. Eslinger; Alvin Sinderbrand

[57] ABSTRACT

A brushless motor comprises a magnet having a plurality of pole faces, a plurality of conductors mounted adjacent to the pole faces, and a plurality of phase coils connected together at a neutral point. The magnet is included in the motor rotor and the phase coils are included in the motor stator. A high-frequency signal source supplies a high-frequency signal to the neutral point, whereby changes in eddy current loss and thus the position of the rotor with respect to the stator are detected.

7 Claims, 9 Drawing Figures

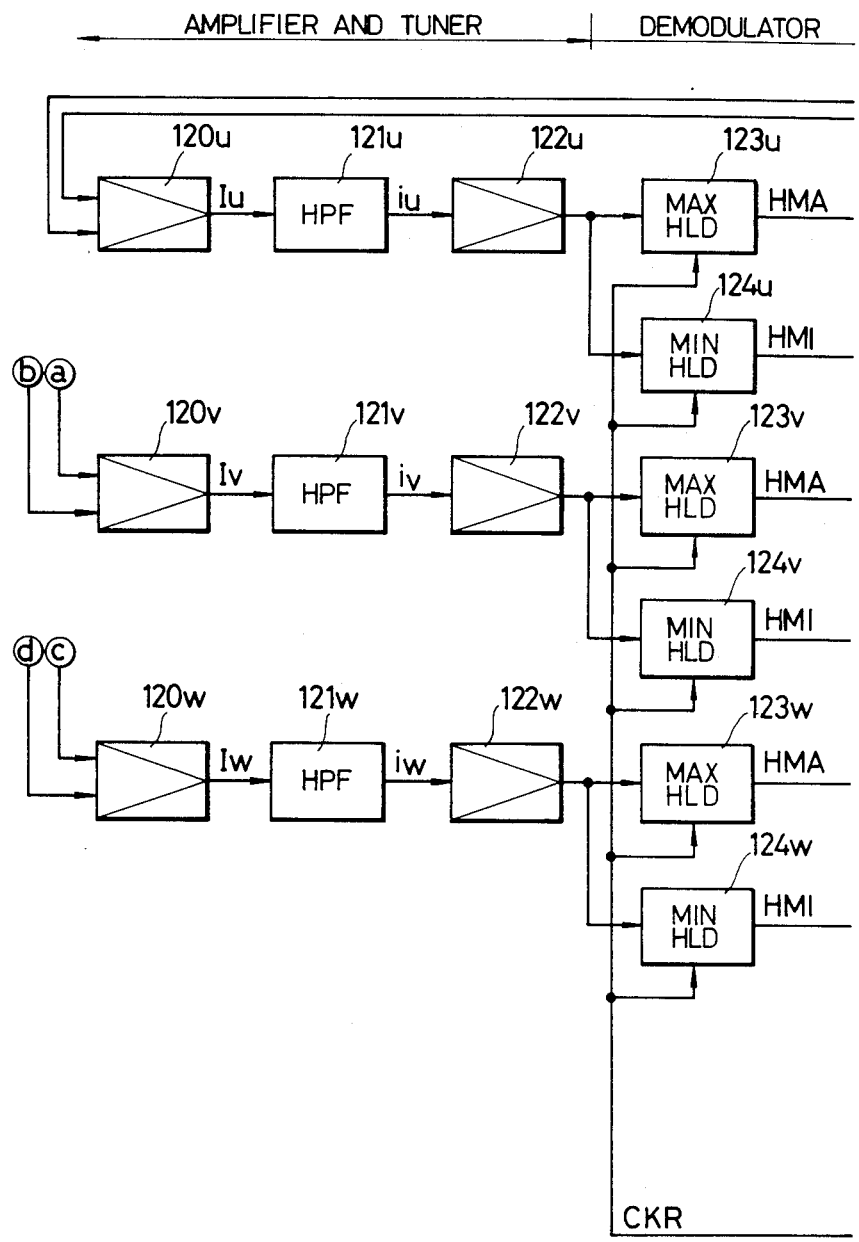

BRUSHLESS MOTOR

BACKGROUND OF THE INVENTION

1. Field of the Invention

This invention relates to brushless motors and, more particularly, to a novel and highly-effective brushless motor including means for detecting the angular position of the rotor thereof.

2. Description of the Prior Art

In the case of conventional brushless motors, when it is desired to provide for obtaining information about the angular position of the rotor, a sensor such as a Hall element is widely used.

Japanese patent publication No. 31304/1984, published Aug. 1, 1984, describes another method of obtaining such information, wherein an RF current flows through an excitation coil to detect a change in an induction current due to a change in position of the excitation coil relative to a stator coil.

Conventional motors of the first type described above cannot be made as compact as is desired in many applications, since the sensor element and its lead wires require a substantial amount of space. The sensor element and lead wires also add significantly to the cost of the motor.

In conventional motors of the second type described above, the sensor element can be omitted. However, an excitation coil is required, together with an inductor for increasing the induction current between the excitation coil and the stator coil. Moreover, a balancer for the inductor must be mounted in the rotor. As a result, the overall structure becomes larger, more complex, and more expensive than is desired in many applications.

OBJECTS AND SUMMARY OF THE INVENTION

An object of the present invention is to solve the problems of conventional brushless motors described above and, more particularly, to provide a brushless motor that provides information about the angular position of the rotor without incorporating a position sensing element.

Another object of the invention is to employ a conductor in a simple brushless motor having a rotor magnet in such a manner as to perform position detection.

Another object of the invention is to provide a brushless motor that includes means for detecting the position of the rotor without producing any noise due to switching.

Another object of the invention is to provide a compact, low-cost brushless motor.

In accordance with one aspect of the invention, the foregoing and other objects are attained by the provision of a brushless motor comprising: a magnet having a plurality of pole faces; a plurality of conductors mounted adjacent to the pole faces; a plurality of phase coils connected together at a neutral point, one of the magnet and the phase coils being included in a movable motor element and the other being included in a stationary motor element; and a high-frequency signal source for supplying a high-frequency signal to the neutral point, whereby changes in eddy current loss and thus the position of the movable motor element with respect to the stationary motor element are detected.

BRIEF DESCRIPTION OF THE DRAWINGS

A better understanding of the objects, features and advantages of the invention can be gained from a consideration of the following detailed description of the preferred embodiment thereof, in conjunction with the appended figures of the drawing, wherein like reference characters indicate the same elements and parts, and wherein.

DESCRIPTION OF THE PREFERRED EMBODIMENT

Figure 1:
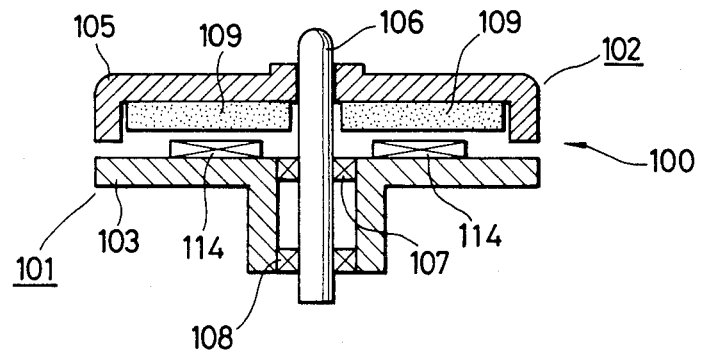
FIG. 1 is a view substantially in longitudinal section of a preferred embodiment of a brushless motor according to the present invention.
Figure 2:
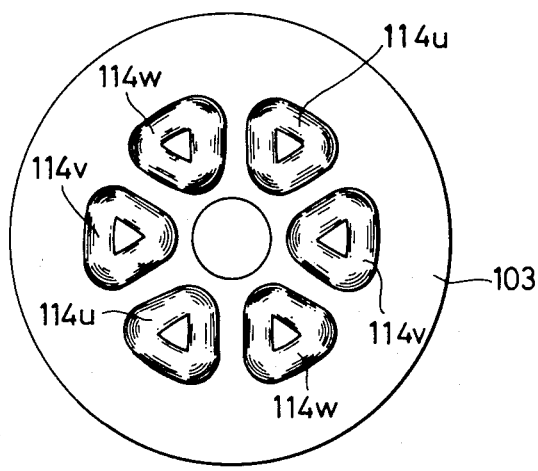
FIG. 2 is a plan view of the motor of FIG. 1.

A motor in accordance with the present invention may be, for example, a flat brushless motor 100 (FIG. 1). The motor 100 comprises a stator 101 and a rotor 102. A plurality of coils shown generally as 114 in FIG. 1 and more particularly as 114u, 114v, 114w in FIG. 2 are equiangularly mounted on a disk-like base 103 of the stator 101, as best shown in FIG. 2. Every pair of coils that are mounted on opposite sides of the center of the base 103 with respect to each other are connected in series with each other. For example the coils 114u are thus connected with each other. As FIG. 1 shows, a disk-like yoke 105 is mounted integrally with a rotating shaft 106 and is supported by bearings 107 and 108.

Figure 3:
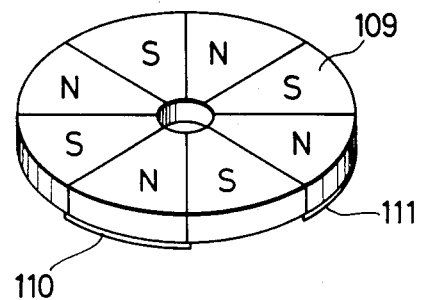
FIG. 3 is a perspective view of the magnet for the rotor of the motor of FIG. 1.
Figure 4:
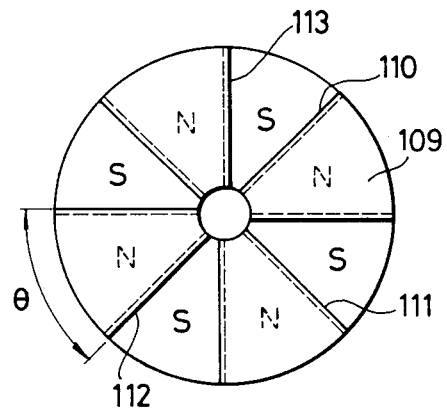
FIG. 4 is a plan view of the rotor magnet shown in FIG. 3.

A magnet 109 is fixed to the yoke 105. The magnet 109 thus included in the rotor 102 is magnetized with alternating N and S (north and south) poles of which each comprises a sector-shaped region, as FIGS. 3 and 4 show. The magnet 109 (FIGS. 1, 3 and 4) may be formed with, for example, eight such poles. The motor 100 is thus a three-phase DC brushless motor wherein the rotor 102 is driven as disclosed, for example, in a patent to Ishii et al. U.S. Pat. No. 4,417,167, assigned to the assignee of the present application. Sector-shaped conductors 110, 111, 112 and 113 are mounted on the N (north) pole faces or on the S (south) pole faces of the magnet 109 which respectively oppose the stator coils 104. Each of the conductors 110 to 113 is formed of a material such as a copper film of 100 to 200 μm thickness, or of a plated conductor and has low electrical resistance. The vertex angle θ (FIG. 4) of the sector-shaped regions is preferably slightly greater than 45°. However, the angle may be equal to or less than 45°.

Figure 5:
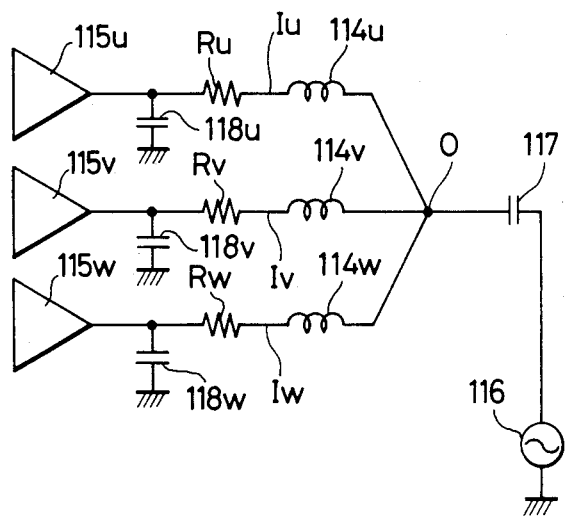
FIG. 5 is a diagram of part of a drive circuit for the motor of FIG. 1.

FIG. 5 shows part of a motor drive circuit. In FIG. 5, the U-, V- and W-phase coils 114u, 114v and 114w are shown as Y-connected. One end of each of the coils 114u, 114v and 114w is connected to a neutral point O. A drive current is supplied from drive amplifiers 115u, 115v and 115w to the coils 114u, 114v and 114w through coil current detection resistors $R_u$, $R_v$ and $R_w$ at predetermined times. A constant RF signal of 20 to 100 kHz is supplied from an RF oscillator 116 to the neutral point O through a coupling capacitor 117. Damping capacitors 118$u$, 118$v$ and 118$w$ are connected between the outputs of the respective amplifiers 115$u$, 115$v$, 115$w$ and ground. Most of the total RF impedances of the respective phase circuits are those of the coils 114$u$, 114$v$ and 114$w$, and the impedances of the other circuit elements are kept small. Therefore, one end of each of the damping capacitors 118$u$, 118$v$ and 118$w$ is grounded, as shown in FIG. 5, or is supplied with a power source voltage $V_{cc}$.

Figure 6:
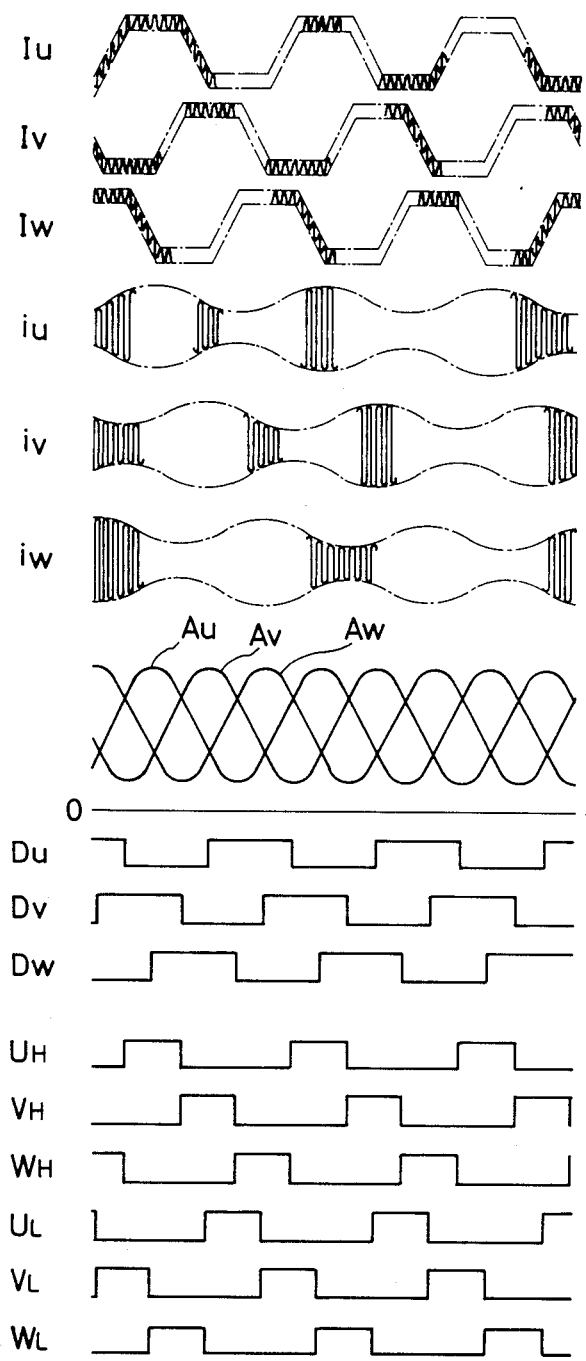
FIG. 6 is a timing diagram showing the operation of the motor of FIG. 1.

With this arrangement, RF-superposed drive currents $I_u$, $I_v$ and $I_w$ flow through the coils 114$u$, 114$v$ and 114$w$ upon rotation of the rotor, as shown in FIGS. 5 and 6. When the coils 114$u$, 114$v$ and 114$w$ (FIG. 5) sequentially come close to the conductors 110 to 113 (FIGS. 3 and 4), eddy currents are induced in the conductors 110 to 113 by the RF magnetic fields from the coils, so that impedances of the coils are substantially increased. Therefore, when the currents $I_u$, $I_v$ and $I_w$ are filtered through high-pass filters, RF current components $i_u$, $i_v$ and $i_w$ are derived (FIGS. 6 and 7A). The amplitudes of the RF components $i_u$, $i_v$ and $i_w$ vary in accordance with angular position of the rotor. The components $i_u$, $i_v$ and $i_w$ are amplified by amplifiers 122$u$, 122$v$ and 122$w$, respectively. The curves $A_u$, $A_v$ and $A_w$ in FIG. 6 do not represent actually produced signals but show the amplitudes of the amplified envelopes of the signals $i_u$, $i_v$ and $i_w$. The curves $A_u$, $A_v$ and $A_w$ range between maximum levels where the envelopes of the RF current components $i_u$, $i_v$ and $i_w$ are widest and minimum levels where the envelopes of the RF current components are narrowest.

Cross-points of the curves $A_u$, $A_v$ and $A_w$ are in effect detected to obtain pulses $D_u$, $D_v$ and $D_w$, respectively. Thus the pulse $D_u$ is high when $A_w$ exceeds $A_u$ and low otherwise; the pulse $D_v$ is high when $A_u$ exceeds $A_v$ and low otherwise; and the pulse $D_w$ is high when $A_v$ exceeds $A_w$ and low otherwise. The pulses $D_u$, $D_v$ and $D_w$ are applied to a comparison circuit shown schematically in FIG. 7B. The comparison circuit compares these pulses $D_u$, $D_v$ and $D_w$ to a reference level $V_{cc}/2$ to obtain switching signals $U_H$ (which is high when $D_u$ is low and $D_v$ is high and low otherwise), $V_H$ (which is high when $D_v$ is low and $D_w$ is high and low otherwise), and $W_H$ (which is high when $D_w$ is low and $D_u$ is high and low otherwise) and switching signals $U_L$ (which is high when $D_u$ is high and $D_v$ is low and low otherwise), $V_L$ (which is high when $D_v$ is high and $D_w$ is low and low otherwise) and $W_L$ (which is high when $D_w$ is high and $D_u$ is low and low otherwise). The switching signals $U_H$, $U_L$; $V_H$, $V_L$; $W_H$, $W_L$ are supplied to the bases of NPN transistors or other suitable switch means so as to perform three-phase 120° energization of the motor.

FIG. 7 shows a motor drive circuit embodying the principle of operation described above.

The motor drive circuit in the embodiment of FIG. 7 comprises: an amplifier and tuner section for amplifying the RF-superposed drive currents $I_u$, $I_v$ and $I_w$ (FIG. 6) derived from the detection resistors $R_u$, $R_v$ and $R_w$ and generating the RF current components $i_u$, $i_v$ and $i_w$; a demodulator section for demodulating changes in the respective amplitudes of the components $i_u$, $i_v$ and $i_w$; a comparator section for comparing selected pairs of outputs from the demodulator section; a latch circuit section for receiving clock signals at proper times and latching input data from the comparators; a comparison circuit section for forming the switching signals $U_H$, $V_H$ and $W_H$ and the switching signals $U_L$, $V_L$ and $W_L$ in accordance with the data from the latch circuit section; a switching circuit section for performing the actual switching in response to the switching signals; and a clock generator section.

An RF signal of, for example, 20 to 100 kHz from an RF oscillator 116 is supplied to the coils 114$u$, 114$v$ and 114$w$ through a buffer amplifier 119 and the capacitor 117. The switched drive currents also flow through the coils 114$u$, 114$v$ and 114$w$. When signals appearing across the detection resistors $R_u$, $R_v$ and $R_w$ are supplied to differential amplifiers 120$u$, 120$v$ and 120$w$, the currents $I_u$, $I_v$ and $I_w$ of FIG. 6 are obtained. The currents $I_u$, $I_v$ and $I_w$ are filtered through quadratic high-pass filters 121$u$, 121$v$ and 121$w$ to obtain the respective RF current components $i_u$, $i_v$ and $i_w$ of FIGS. 6 and 7A. The components $i_u$, $i_v$ and $i_w$ are respectively amplified by amplifiers 122$u$, 122$v$ and 122$w$, and the amplified signals are supplied to maximum value holding circuits 123$u$, 123$v$ and 123$w$ and minimum value holding circuits 124$u$, 124$v$ and 124$w$, all of which constitute demodulating means. The demodulating means holds the maximum and minimum values to obtain maximum and minimum DC levels of the components $i_u$, $i_v$ and $i_w$. Maximum values HMA (FIG. 7A) shown graphically in FIG. 8 are generated by the maximum value holding circuits 123$u$, 123$v$ and 123$w$, respectively. Minimum values HMI (FIG. 7A) shown graphically in FIG. 8 are generated by the minimum value holding circuits 124$u$, 124$v$ and 124$w$, respectively. The maximum and minimum holding circuits are reset at predetermined times in response to a reset pulse CKR generated by the clock generator (FIG. 7B).

The three maximum values HMA and the three minimum values HMI (FIG. 7A) are selectively supplied to algebraic adders 125, 126, 127, 128, 129 and 130 (FIG. 7B) included in the comparator means, so that differences between the values HMA and HMI are calculated, thereby obtaining amplitude changes including the DC components of $i_u$, $i_c$ and $i_w$. Selected pairs of amplitude changes are supplied to the comparators proper 131$u$, 131$v$ and 131$w$, which respectively calculate cross-points of the amplitude changes.

The noise that is often generated immediately after the currents flowing through the coils 114$u$, 114$v$ and 114$w$ are switched may influence the amplitudes of the components $i_u$, $i_v$ and $i_w$. In order to eliminate such influence, the latch circuit is arranged to latch the data (except the initial data) upon switching. Furthermore, the values HMA and HMI are supplied to the adders 125 to 130 (FIG. 7B) in the form shown in FIG. 8 in order to eliminate the influence of the noise.

Figure 7B:
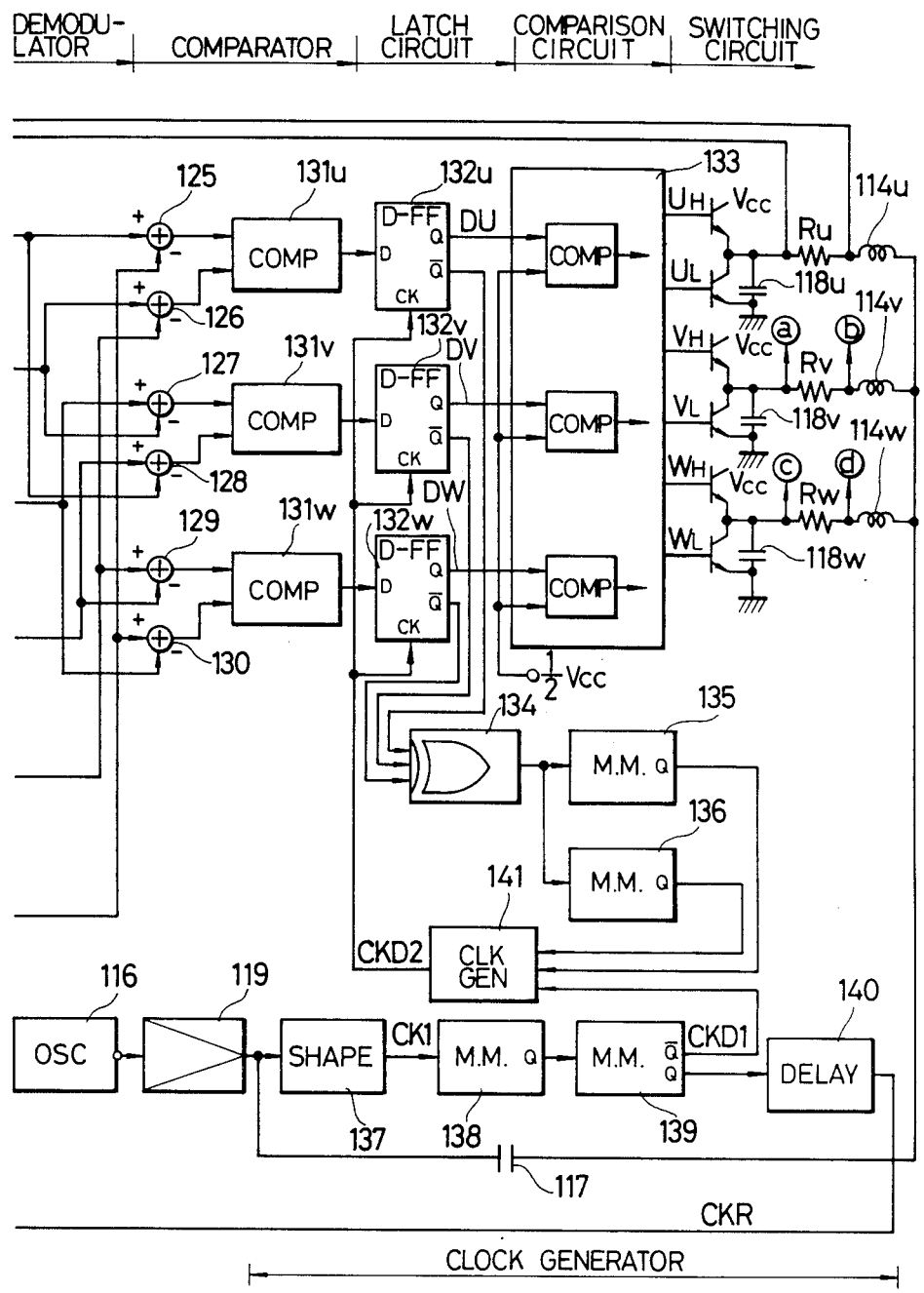
FIG. 7, consisting of FIGS. 7A and 7B arranged with FIG. 7A to the left of FIG. 7B, is a block diagram of the drive circuit for the motor of FIG. 1.
Figure 8:
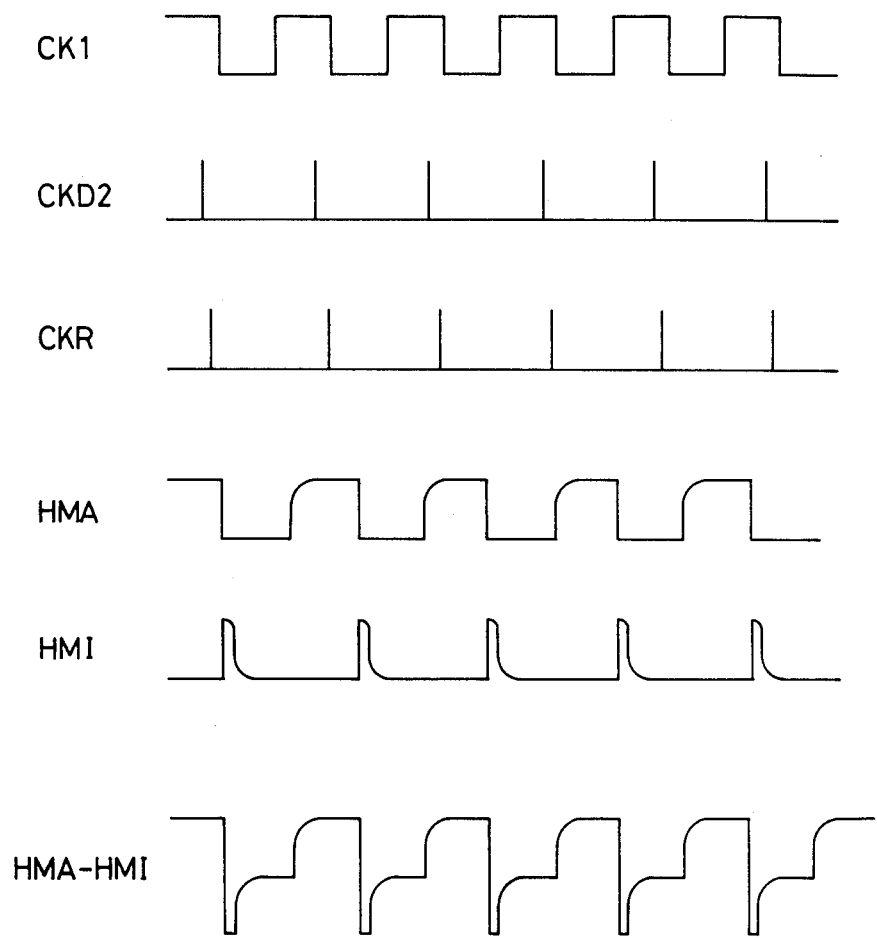
FIG. 8 is a timing diagram showing the operation of the drive circuit shown in FIG. 7.

The latch circuit comprises D flip-flops 132$u$, 132$v$ and 132$w$ which respectively receive the outputs of the comparators 131$u$, 131$v$ and 131$w$ in response to latch clock pulses CKD2 (FIGS. 7B and 8). The reset pulse CKR (FIGS. 7B and 8) supplied to the maximum and minimum value holding circuits (FIG. 7A) is generated, as FIG. 8 shows, immediately after the latch clock CKD2 is generated.

The flip-flops 132$u$, 132$v$ and 132$w$ generate the signals $D_u$, $D_v$ and $D_w$ shown in FIG. 6. The signals $D_u$, $D_v$, $D_w$ have phase relationships of 120° with respect to one another. The comparison circuit 133 compares the signals $D_u$, $D_v$ and $D_w$ with a reference voltage $V_{cc}/2$ to form the switching signals $U_H$, $V_H$ and $W_H$ and the switching signals $U_L$, $V_L$ and $W_L$ in accordance with the signals $D_u$, $D_v$ and $D_w$.

These switching signals are respectively supplied to the bases of six NPN transistors. Reading from top to bottom in FIG. 7B, the odd collectors of the transistors are connected to positive supply voltage $V_{cc}$, the even emitters are grounded, and the odd emitters are connected to the even collectors. The circuitry of the circuit 133 is similar to circuitry in the manner disclosed in a U.S. Pat. No. 4,358,720, to Fumyoshi Abe Zama assigned to Sony Corporation.

The $\overline{Q}$ signals corresponding respectively to the signals $D_u$, $D_v$ and $D_w$ are supplied to a three-input Exclusive-OR gate 134. The output of the Exclusive-OR gate 134 is supplied to monostable multivibrators 135 and 136 which are respectively operated in response to the leading and trailing edges of the output. Therefore, the changes in the signals $D_u$, $D_v$ and $D_w$ are detected.

The RF signal generated by the oscillator 116 and buffer amplifier 119 is applied to a waveshaper 137, which converts it to a pulse CK1 shown in FIG. 8. Monostable multivibrators 138 and 139 are connected in series and triggered in response to the pulse CK1, thereby obtaining a clock CKD1 from the $\overline{Q}$ output of the monostable multivibrator 139. A delay circuit 140 generates the reset pulse CKR in accordance with the Q output of the monostable multivibrator 139, which output is complemental to the clock CKD1. Outputs from the monostable multivibrators 135 and 136 and the clock signal CKD1 are supplied to a latch clock generator 141. The latch clock generator 141 generates the latch clock CKD2 (FIGS. 7B and 8) except when the signals $D_u$, $D_v$ and $D_w$ are being updated. That is, the outputs from the monostable multivibrators 135 and 136 control the operation of the latch clock generator 141 to prevent the generation of the latch clock CKD2 thereby, so that the operation of the latch circuits 132$u$, 132$v$ and 132$w$ is stopped during a short period after each switching of the signals from the comparators 131$u$, 131$v$ and 131$w$.

Thus there is provided in accordance with the invention a novel and highly-effective brushless motor that omits the conventional position sensing element yet includes means for detecting the angular position of the rotor. Unlike in the conventional motor wherein an RF current flows through the coil to detect a change in induction current, in accordance with the present invention changes in eddy current loss upon rotation of the rotor are detected, so that a simple structure comprising a magnet and a conductor can be utilized. Therefore, the present invention is extremely advantageous in providing a compact, low-cost brushless motor.

Many modifications of the preferred embodiment of the invention will readily occur to those skilled in the art upon consideration of this disclosure. For example the present invention is applicable not only to a flat brushless motor as illustrated but also to a cylindrical brushless motor, a linear motor (for linearly driving a carriage or the like, etc.). Also, the magnet may serve as the stator and the coil may serve as the rotor. Accordingly, the invention is limited only by the appended claims.

I claim:

1. A brushless motor comprising:
   a magnet having a plurality of pole faces;
   a plurality of conductors mounted adjacent to said pole faces;
   a plurality of phase coils connected together at a neutral point, one of said magnet and said phase coils being included in a movable motor element and the other being included in a stationary motor element; and
   a high-frequency signal source for supplying a high-frequency signal to said neutral point, whereby changes in eddy current loss and thus the position of said movable motor element with respect to said stationary motor element are detected.

2. A brushless motor according to claim 1; wherein said movable motor element is a rotor and said stationary motor element is a stator.

3. A brushless motor according to claim 1; further comprising:
   means for detecting currents respectively flowing through said phase coils;
   filtering means for extracting high-frequency components from the detected currents;
   amplitude means for generating amplitude signals representative of the amplitudes of the high-frequency components from said filtering means;
   rectangular wave signal means for converting said amplitude signals to rectangular wave signals; and
   switch means for forming switching signals in accordance with said rectangular wave signals, said switching signals controlling the drive currents to said respective phase coils.

4. A brushless motor according to claim 3; wherein said amplitude means comprises maximum value holding means for generating signals respectively representative of the maximum amplitudes of said high-frequency components and minimum value holding means for generating signals respectively representative of the minimum amplitudes of said high-frequency components, said signals representative of maximum amplitudes and said signals representative of minimum amplitudes respectively being subtracted and compared to produce compared output signals supplied as inputs to said rectangular wave signal means.

5. A brushless motor according to claim 4; wherein said rectangular wave signal means comprises latch means for generating a pulse $D_u$, a pulse $D_v$ and a pulse $D_w$, said pulses $D_u$, $D_v$, $D_w$ having phase relationships of 120° with respect to one another.

6. A brushless motor according to claim 5; wherein said switching signals comprise a signal $U_H$ that is high when $D_u$ is low and $D_v$ is high and low otherwise; a signal $V_H$ that is high when $D_v$ is low and $D_w$ is high and low otherwise; a signal $W_H$ that is high when $D_w$ is low and $D_u$ is high and low otherwise; a signal $U_L$ that is high when $D_u$ is high and $D_v$ is low and low otherwise; a signal $V_L$ that is high when $D_v$ is high and $D_w$ is low and low otherwise; and a signal $W_L$ that is high when $D_w$ is high and $D_u$ is low and low otherwise.

7. A brushless motor according to claim 6; further comprising six NPN transistors respectively having bases responsive to said signals $U_H$, $U_L$, $V_H$, $V_L$, $W_H$, $W_L$ and connected in pairs for supplying drive current to said respective phase coils.

* * * * *